UNITED STATES PATENT OFFICE.

BURDETT L. ROWLEY, OF NEW BRITAIN, CONNECTICUT.

IMPROVEMENT IN INLAYING METALS WITH RUBBER.

Specification forming part of Letters Patent No. 133,259, dated November 19, 1872.

*To all whom it may concern:*

Be it known that I, BURDETT L. ROWLEY, of New Britain, in the county of Hartford and in the State of Connecticut, have invented certain new and useful Improvements in Method of Uniting Rubber and Metals; and do hereby declare that the following is a full, clear, and exact description thereof.

The object of my invention is to unite metal and rubber in a thorough and durable manner; and it consists in the method employed, substantially as and for the purpose hereinafter specified.

My invention is more especially designed for use upon ornamental castings, such as escutcheons, key-hole guards, bolt-keepers, &c., but is equally applicable to any article in which it is desired to produce a plane or uniform surface by filling or inlaying all depressions or interstices. In the use of my method the article to be operated upon is heated to a temperature of about 175°, a thin sheet of rubber placed upon the side which is to be inlaid, and the whole then placed within a press and subjected to a heavy pressure, so as to cause said rubber to fill each depression, after which the article is placed within a suitable oven and the rubber vulcanized and rendered hard in the usual manner. The article operated upon thus far is now placed upon a suitable abrading surface and the surplus rubber above the metal removed, so as to cause the surface of said article to be uniform. A beautiful contrast now exists between the polished metal and the filling, the latter serving to bring out and render more distinct the outlines of the former, so as to cause a very ordinary casting to present a very attractive appearance.

If desired, the metal may be cast in a thin open form and the rubber pressed into the same, and also caused to form a backing for the support of said metal; but in either case the manipulations required are alike.

It has been found that rubber and metal united by my method cannot readily be separated, however thin the layer of either, but that the shallow depressions of a casting are as permanently filled as are the deep well-defined cavities.

Having thus fully set forth the nature and merits of my invention, what I claim as new is—

The hereinbefore-described method of uniting metal and rubber, substantially as and for the purpose specified.

In testimony that I claim the foregoing I have hereunto set my hand this 5th day of October, 1872.

BURDETT L. ROWLEY.

Witnesses:
GEO. S. PRINDLE,
JOHN R. YOUNG.